United States Patent [19]

Keck

[11] 4,098,845
[45] Jul. 4, 1978

[54] METHOD FOR ACCELERATING THE CRYSTALLIZATION RATE OF CRYSTALLIZABLE POLYESTER RESIN

[75] Inventor: Max H. Keck, Cuyahoga Falls, Ohio

[73] Assignee: The Goodyear Tire & Rubber Company, Akron, Ohio

[21] Appl. No.: 665,843

[22] Filed: Mar. 11, 1976

[51] Int. Cl.$^2$ ............................................. C08L 67/00
[52] U.S. Cl. ...................................... 260/860; 526/1;
526/336; 528/309; 528/285
[58] Field of Search ............................ 260/860, 75 T;
526/11.1, 1, 336

[56] References Cited

U.S. PATENT DOCUMENTS

| 3,367,926 | 2/1968 | Voeks | 526/1 X |
| 3,692,744 | 9/1972 | Rich et al. | 260/75 T |
| 3,962,368 | 6/1976 | Herwig et al. | 260/860 X |

FOREIGN PATENT DOCUMENTS

| 773,056 | 4/1957 | United Kingdom. |
| 850,363 | 10/1960 | United Kingdom. |

OTHER PUBLICATIONS

Chem. Abs. 88:7747z; 87:69291j; 87:53715q; 87:40096p; 87:39955m; 87:6510j; 86:172606u; 85:160857t; 85:160855r; 85:143937b; 84:44873a; 84:5755u; 84:5592p; 83:164770r; 82:156859r; 82:98656j; 82:18442y; 81:153359w; 81:137043h; 81:79196u; 81:65033r; 81:50221r; 81:50217u; 81:37975v; 81:26054t; 81:13910u; 80:121480s; 80:3925t; 79:54141w; 79:19527e; 79:6013j; 78:148357c; 78:137217f; 78:136852x; 78:72793u; 78:30554m; 77:89043b; 77:75615c; 77:62447z; 77:35071r; 77:5889w; 76:127573p; 76:113702t; 76:73123w; 53:p12702c.

*Primary Examiner*—Thomas De Benedictis, Sr.
*Attorney, Agent, or Firm*—J. M. Wallace, Jr.

[57] ABSTRACT

This invention relates to crystallizable polyester compositions having improved molding characteristics. Crystallization rates and properties are improved by the addition of a polymer derived from meta or para diisopropenyl benzene and such polymers terminated by α-methyl styrene.

4 Claims, No Drawings

METHOD FOR ACCELERATING THE CRYSTALLIZATION RATE OF CRYSTALLIZABLE POLYESTER RESIN

This invention relates to compositions comprising crystallizable polyester resins which are characterized by improved molding characteristics. More particularly this invention relates to molding compositions of polyethylene terephthalate and crystallizable copolymers thereof and a material that accelerates the crystallization of these resins.

Crystalline polyethylene terephthalate homopolymer and copolymers thereof containing up to about 15 weight percent of repeat units of saturated aliphatic dicarboxylic acids have excellent physical properties which permit the use of such polymers for high temperature mechanical applications. However, polyethylene terephthalate and copolymers thereof crystallize relatively slowly and this limits the use of these polyesters for articles formed by injection molding processes. This slow crystallization confers both low impact resistance and low dimensional stability to articles produced therefrom.

The addition of crystallization accelerator to crystallizable resins reduces the crystallization time of these polyesters.

The present invention comprises molding compositions of (A) polyethylene terephthalate homopolymer or copolymers thereof containing up to about 15 weight percent of repeat units of a copolymerizable monomer selected from the group consisting of saturated aliphatic dicarboxylic acids having from 4 to 10 carbon atoms, said homopolymer or copolymer having (A) an intrinsic viscosity of at least 0.4 and (B) from 0.5 to 5.0 weight percent of the polymer of a molding aid and crystallization accelerator consisting of a polymeric material derived from the polymerization of a monomer selected from the group consisting of the meta diisopropylbenzene diol, para diisopropylbenzene diol, meta diisopropenylbenzene, para diisopropenylbenzene and poly(para tertiary butyl styrene). In preparing the molding compositions of this invention preferred accelerators of crystallization are polymeric materials prepared by the simultaneous dehydration and polymerization of either of the meta or para isomers of diisopropylbenzene diol.

These polymers of the diisopropylbenzene diols and diisopropenylbenzene are thought to have structures containing units of indane, 1-pentene and 2-pentene. The units in the polymer are considered to be represented by the structure

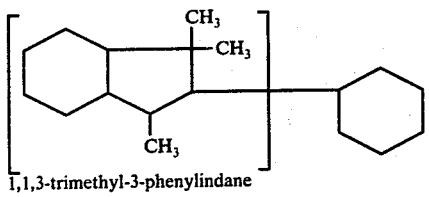

1,1,3-trimethyl-3-phenylindane

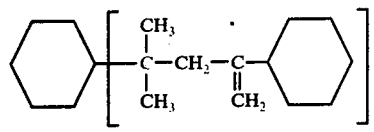

2,4-diphenyl-4-methyl-1-pentene

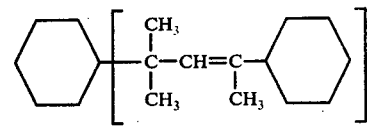

2,4-diphenyl-4-methyl-2-pentene

The indane unit content can vary from about 20 to about 100 percent. Generally the indane content will be 90 percent or less, the balance of the polymer being a mixture of the above two pentene structures.

EXAMPLE 1

A mixture of 42.7 grams of dimethyl terephthalate, 32.7 grams of ethylene glycol, 0.0128 gram of manganese acetate and 0.0128 gram of antimony oxide was placed in a glass reaction tube equipped with a stirrer and a side arm with a condenser. The mixture was heated at 185° to 200° C. for about 3 hours until the evolution of methanol had ceased. At this point 0.80 gram (1.88 weight percent based on the dimethyl terephthalate) of polymerized para diisopropenylbenzene was added. (The polymerized diisopropenylbenzene was prepared by treating β-diisopropylbenzene diol with Super Filtrol 1 Clay, an acid treated clay catalyst sold by Filtrol Corporation having an acid number of 8.) The temperature was raised to 235° C. and after 15 minutes was raised to 250° C. After the reaction mixture had been heated for 30 minutes at 250° C., simultaneous raising of the temperature to 270° C. and gradual reduction of the pressure in the reaction to 0.4 Torr was carried out over a 20 minute period. Heating and stirring were continued at 270° C. and 0.4 Torr for about 1 hour at which point the polymer was very viscous. The melt was opaque rather than clear. When the stirring shaft was withdrawn from the reaction mixture it was observed that the polymer adhering to it crystallized with extreme rapidity. The intrinsic viscosity (I.V.) of this polymer was 0.585 determined in a 60/40 phenoltetrachloroethane mixed solvent at 30.0° C.

| Crystallization ½ Times for the Above Polymer | | Polyethylene Terephthalate Homopolymer Control* | |
|---|---|---|---|
| Temperature | ½ Time | Temperature | ½ Time |
| 225° C. | 7 seconds | 225° C. | 42 seconds |
| 200° C. | 5 seconds | 200° C. | 22 seconds |
| 175° C. | 3 seconds | 175° C. | 22 seconds |
| 150° C. | 4 seconds | 150° C. | 30 seconds |

*This resin was prepared from terephthalic acid and ethylene glycol.

EXAMPLE 2

Following the procedure described in Example 1 another composition was prepared which contained only 1 weight percent of the polymerized diisopropenylbenzene instead of 1.88 weight percent. The I.V. of this modified polymer was 0.653 (determined as in Example 1).

| Crystallization ½ times for the above polymer | |
| --- | --- |
| Temperature | ½ Time |
| 225° C. | 20 seconds |
| 200° C. | 6 seconds |
| 175° C. | 4 seconds |
| 150° C. | 4 seconds |

EXAMPLE 3

Following the procedure described in Example 1 another polyethylene terephthalate composition was prepared which contained 2 weight percent of polymerized diisopropenylbenzene. (This sample of polymerized p-diisopropenylbenzene was prepared directly from p-diisopropenylbenzene by refluxing in a solvent in the presence of Super Filtrol-1 clay.) This modified polymer was observed to crystallize at a much faster rate than a polyethylene terephthalate control sample. The I.V. was 0.600 determined as in Example 1.

EXAMPLE 4

Into a steel reactor was charged 4.04 pounds of dimethyl terephthalate, 2.85 pounds of ethylene glycol and 0.076 PPT of Mn Octasol. (Manganese salt of a mixture of long chain acids) This mixture was heated and stirred for 220 minutes over the temperature range of 175° to 230° C. At the end of this period 745 milliliters of methanol had been distilled. When the evolution of methanol ceased the low molecular weight polymer was transferred to a stainless steel polymerization vessel. $Sb_2O_3$ (0.21 PPT), triethylenediphosphite (0.04 PPT) and polymerized p-diisopropenylbenzene (200 PPT) (2 weight percent based on the dimethyl terephthalate) were added to the reactor. Over a 130 minute period the reaction temperature was raised from 215° to 245° C. while the reaction pressure was gradually reduced from atmospheric pressure to 0.4 Torr.

The reaction was continued for 160 minutes at about 270° to 277° C. at 0.4 Torr pressure. Then the polymer was discharged from the reactor and was observed to crystallize very rapidly, more rapidly than the polyethylene terephthalate control. The intrinsic viscosity was found to be 0.622 determined as in Example 1.

EXAMPLE 5

The above reaction was repeated with the polymerization time under vacuum being extended to 195 minutes (instead of 160 minutes). Intrinsic viscosity of the polymer prepared was 0.694.

EXAMPLE 6

The modified polymers described in Examples 4 and 5 were ground to an average particle size of about 2 to 4 millimeters. They were vacuum dried at 135° C., dry mixed with 30 weight percent glass fiber and injection molded. The mold temperature was at 135° C. It was found that a 22 second molding cycle was sufficient to provide a satisfactorily crystallized molded product. With a control run using polyethylene terephthalate containing no nucleating agent it was found that 90 seconds molded cycle was required to provide a molded product of satisfactory quality.

EXAMPLE 7

In essentially the same manner as described in Example 4 an 85/15 ethylene terephthalate/azelate copolymer was prepared which contained 2 weight percent polymerized diisopropenylbenzene. Thus 16.9 pounds of dimethyl terephthalate, 11.9 pounds of ethylene glycol and 0.076 PPT of Mn(Octâsol) were reacted until the evolution of methanol had ceased. Azelaic acid (2.89 pounds) and triethylenediphosphite (0.04 PPT) were added and reacted until the evolution of water had ceased (ca. 30 minutes). The reaction mixture was transferred to the polymerization vessel, after which 204 PPT of polymerized diisopropenylbenzene and 0.21 PPT of $Sb_2O_3$ were added. This mixture was heated under vacuum until a high molecular weight product was obtained. The intrinsic viscosity was 0.633. The melting point was 234° C. as determined by differential thermal analysis.

EXAMPLE 8

A portion of the above (Example 7) copolymer was injection molded in the same manner as described in Example 6. With this copolymer composition it was possible to use a mold temperature of 110° C. along with the 22 second molding cycle to obtain excellent molded products.

The diisopropenylbenzene polymers can be prepared from diisopropenylbenzene (DIB) monomer or from p-diisopropylbenzene diol (diol) by heating the monomer in the presence of an acid type catalyst such as an acid treated clay, as shown in the co-pending application Ser. No. 665,838 of James J. Tazuma and Richard E. Gloth. The simultaneous dehydration and polymerization of the diol provides polymers which are excellent crystallization accelerators. The softening points of these resinous polymer products range from about 120° C. to about 200° C. (ball and ring method). They generally have a polymerization degree of from about 3 to about 20, a degree of polymerization of 3 to 5 being preferred. The amount of accelerators used can be varied over a wide range. Generally the amount used will be from about 0.5 to 5 percent of the weight of the polyester.

The following examples illustrate the preparation of the polymers used to improve the molding and other properties of the crystallizable polyester resins.

EXAMPLE 9

1.25 grams of p-toluenesulfonic acid and 25 grams (0.1285 mol) of para diol were added to 250 milliliters of dry toluene. The mixture was stirred and heated at reflux for 1.5 hours, during which time water of reaction was collected in a Dean-Stark trap. The resulting solution was cooled to 90° C. 50 milliliters of 6 percent sodium carbonate solution was added with stirring. Filtration followed by evaporation of solvent yielded 14.30 grams of white solid, softening point range 146° – 154° C. The unit composition of the polymer was similar to that of the polymer prepared in Example 3.

EXAMPLE 10

50 grams (0.316 mol) para DIB, 7.5 grams Super Filtrol Grade 1 predried at 100° – 120° C., 0.5 mm. and 167 milliliters toluene were heated to reflux with rapid stirring. After a 90 minute reflux period a 25 milliliter aliquot was withdrawn, filtered and evaporated. The remainder of the reaction mixture was refluxed for a total of three hours before being filtered and evaporated. Both the 90 minute and the 3 hour products were nearly white solids.

| 90 Minute Product |
| --- |
| Softening point range 136–143° C. |
| 2 Percent 1-pentene |
| 4 Percent 2-pentene |
| 94 Percent Indane |

| Three Hour Product |
| --- |
| Melting Point 157–165° C. |
| 5 Percent 2-pentene |
| 95 Percent indane |

The diisopropenylbenzene can be terminated by α-methylstyrene end groups if desired.

The crystallization accelerator can be added to the polyester reactants or at any time during the preparation of polyester. They also can be added to polyester while it is molten after it has been fully prepared or it can be added during the mixing and molding.

While certain representative embodiments and details have been shown for the purpose of illustrating the invention it will be apparent to those skilled in this art that various changes and modifications may be made therein without departing from the spirit or scope of the invention.

What I claim is:

1. A composition comprising a crystallizable polyethylene terephthalate homopolymer and copolymers thereof containing up to about 15 weight percent of repeat units of a copolymerizable monomer selected from the group consisting of saturated aliphatic dicarboxylic acids having from 4 to 10 carbon atoms and from 0.5 to 5 percent by weight of the polyester resin of a polymer selected from the group consisting of a polymer derived from meta diisopropylbenzene diol, para diisopropylbenzene diol, para diisopropylbenzene diol, meta diisopropenylbenzene, para diisopropenylbenzene, para teritary butyl styrene and polymers of meta diisopropenylbenzene and a polymer of para diisopropenylbenzene terminated by α-methyl styrene.

2. A composition comprising polyethylene terephthalate polyester and copolyesters thereof containing up to 15 mol percent of an acid selected from the group consisting of a saturated aliphatic dicarboxylic acid and from 0.5 to 5 percent by weight of the polyesters of a polymer derived from meta diisopropylbenzene diol or para diisopropylbenzene diol, meta diisopropenylbenzene, para diisopropenylbenzene, para tertiary butyl styrene and a polymer of meta or para diisopropenylbenzene terminated by α-methyl styrene.

3. The composition of claim 1 in the form of a molded product.

4. The process of improving the moldability of polyethylene terephthalate which comprises mixing with polyethylene terephthalate from 0.5 to 5.0 percent by weight of a polymer derived from a material selected from the group consisting of meta diisopropylbenzene diol, para diisopropylbenzene diol, meta diisopropenylbenzene, para diisopropenylbenzene and para tertiary butyl styrene.

* * * * *